United States Patent
Currid et al.

(10) Patent No.: US 7,302,512 B1
(45) Date of Patent: Nov. 27, 2007

(54) INTERRUPT STEERING IN COMPUTING DEVICES TO EFFECTUATE PEER-TO-PEER COMMUNICATIONS BETWEEN DEVICE CONTROLLERS AND COPROCESSORS

(75) Inventors: Andrew Currid, Alameda, CA (US); Robert William Chapman, Mountain View, CA (US)

(73) Assignee: Nvidia Corporation, Santa Clara, CA (US)

(*) Notice: Subject to any disclaimer, the term of this patent is extended or adjusted under 35 U.S.C. 154(b) by 98 days.

(21) Appl. No.: 11/297,992

(22) Filed: Dec. 9, 2005

(51) Int. Cl.
*G06F 9/46* (2006.01)

(52) U.S. Cl. ............... 710/268; 710/260; 710/261; 710/263; 710/48

(58) Field of Classification Search ............ 710/48, 710/260, 261, 263, 268
See application file for complete search history.

(56) References Cited

U.S. PATENT DOCUMENTS

| | | | |
|---|---|---|---|
| 2004/0225790 A1* | 11/2004 | George et al. | 710/260 |
| 2005/0033895 A1* | 2/2005 | Lueck et al. | 710/311 |
| 2007/0067534 A1* | 3/2007 | Butler et al. | 710/260 |

OTHER PUBLICATIONS

PCI Express Base Specification Revision 1.1; PCI-SIG; pp. 1-9 and 273-275; Mar. 28, 2005.*
Budruk, Ravi; Anderson, Don; and Shanley, Tom; PCI Express System Architecture; MindShare, Inc.; Chapter 9: Interrupts; Feb. 2005.*
Intel®, "MROMB Design Considerations using the Intel® 80303 I/O Processor," Order No. 273593-002, Sep. 2002, pp. 1-15.

* cited by examiner

*Primary Examiner*—Glenn A. Auve
(74) *Attorney, Agent, or Firm*—Cooley Godward Kronish LLP (57) ABSTRACT

A computer device, an input/output ("I/O") communication subsystem, a chipset and a method are disclosed for implementing interrupt message packets to facilitate peer-to-peer communications between a device controller and a coprocessor. Advantageously, the various embodiments of the invention obviate a requirement for specialized circuitry on a motherboard to establish peer-to-peer communications. In one embodiment, an I/O communication subsystem includes a bus interface for coupling the I/O communication subsystem to a general-purpose bus. It also includes a device controller being configured to generate an interrupt as an interrupt message packet for a coprocessor, which, in turn, interrupts processing functions that otherwise are performed by the host processor. The device controller can reside either internal or external to the I/O communication subsystem.

13 Claims, 7 Drawing Sheets

INTERRUPT STEERING IN COMPUTING DEVICES TO EFFECTUATE PEER-TO-PEER COMMUNICATIONS BETWEEN DEVICE CONTROLLERS AND COPROCESSORS

BRIEF DESCRIPTION OF THE INVENTION

This invention relates generally to computing devices, and more particularly, to steering interrupts from device controllers for peripheral devices, such as input/output ("I/O") controllers, to facilitate peer-to-peer communications with coprocessors, including I/O processors.

BACKGROUND OF THE INVENTION

Enhanced functionality of computing devices is increasingly burdening their host processors and operating systems. To improve performance of computers, designers are off-loading related processes to coprocessors. Typically, such coprocessors govern high-level processes and manage the low-level processes performed by a device controller. For example, computer architectures for storage and network applications off-load input/output ("I/O") processes to coprocessors commonly known as "I/O processors." The I/O processor manages the low-level I/O processes performed by an I/O controller, such as a small computer system interface ("SCSI") controller. To enable the I/O processor to service interrupts and exchange data with the I/O controller, specialized circuitry has been developed to support the interactions between I/O controllers and I/O processors. While functional, traditional approaches to establishing communications between coprocessors and device controllers have a variety of drawbacks, some of which are described next.

Figure 1:
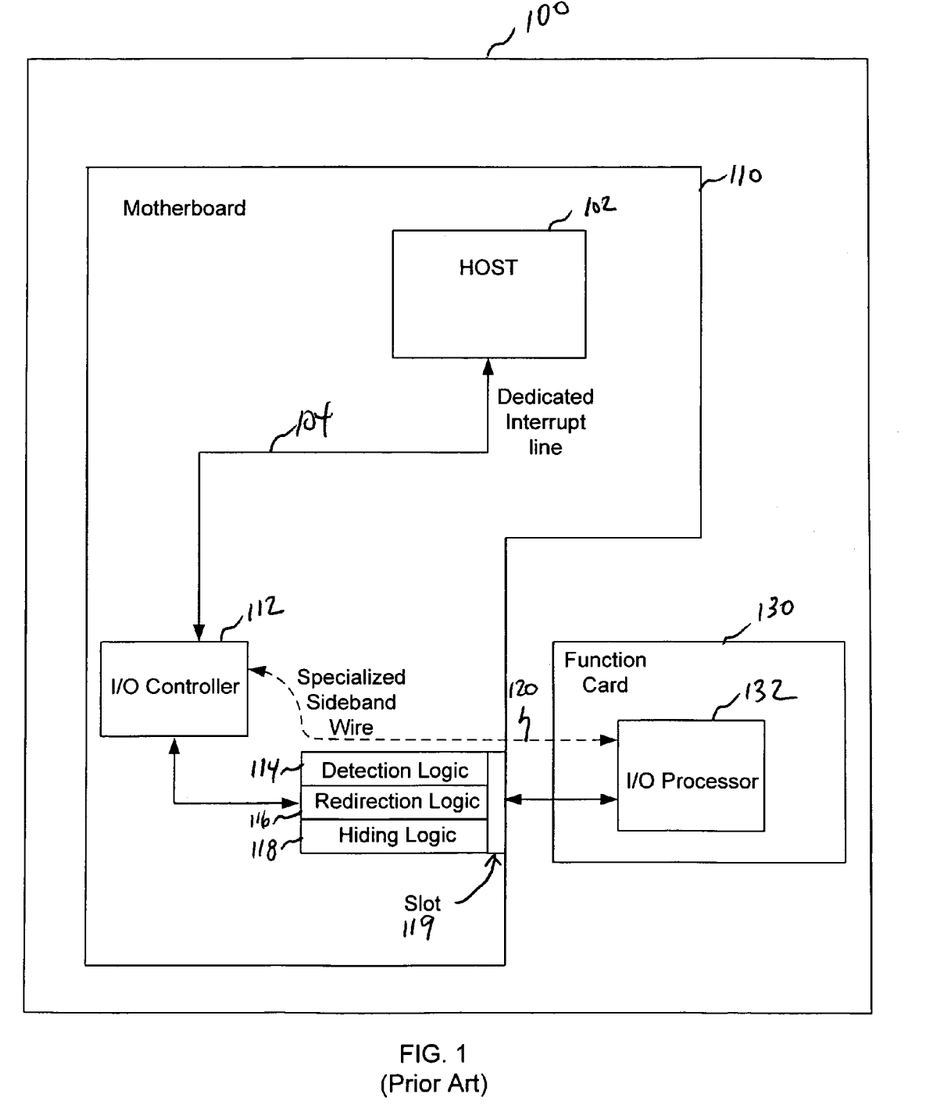
FIG. 1 depicts a conventional computer device implementing specialized circuitry for facilitating data transfers between an I/O controller and an I/O processor.

FIG. 1 depicts a computer device implementing specialized circuitry for facilitating data transfers between an I/O controller and an I/O processor. Computing device 100 includes a motherboard 110 and a function card 130. Specifically, motherboard 110 includes a host 102, an I/O controller 112, detection logic 114, redirection logic 116, hiding logic 118 and a slot 119. Function card 130 includes an I/O processor 132. Host 102 includes a host processor, such as a central processing unit ("CPU"), that is connected via dedicated interrupt line 104 to I/O controller 112. Dedicated interrupt line 104 provides a sideband signal, such as an interrupt signal from I/O controller 112, to host 102 when I/O controller 112 requires computational resources. The sideband signal is typically sent over a specialized sideband channel. Motherboard 110 contains detection logic 114, hiding logic 118 and redirection logic 116 as specialized circuitry to support the interactions between I/O controller 112 and I/O processor 132. Detection logic 114 detects the presence of function card 130 in slot 119. When function card 130 is present, hiding logic 118 isolates I/O controller 112 from host 102 so that the host 102 does not seize control over I/O controller 112. Thereafter, redirection logic 116 redirects interrupts from dedicated interrupt line 104 via a specialized sideband wire 120 to I/O processor 132. Note that I/O controller 112 is generally mounted directly onto motherboard 110.

A drawback to this approach is that motherboard 110 requires adaptation to include the above-described specialize circuitry and specialized sideband wire. These increase the amount of materials, costs and time necessary to manufacture motherboard 110, and make the motherboard non-standard. Further, the specialized circuitry and specialized sideband wire 120 are implemented in slot 119, thereby making the slot a non-standard slot. Non-standard slots restrict their uses to certain types of function cards 130, thereby reducing the number of general-purpose slots available to a user.

In view of the foregoing, it would be desirable to provide a system chipset, a computer device, an apparatus and a method that minimizes the above-mentioned drawbacks, thereby facilitating peer-to-peer communications between coprocessors and device controllers.

SUMMARY OF THE INVENTION

A computer device, an input/output ("I/O") communication subsystem, a chipset, an apparatus, and a method are disclosed for implementing interrupt message packets to facilitate peer-to-peer communications between a device controller and a coprocessor. Advantageously, the various embodiments of the invention obviate a requirement for specialized circuitry on a motherboard to establish peer-to-peer communications. In one embodiment, an I/O communication subsystem includes a bus interface for coupling the I/O communication subsystem to a general-purpose bus. It also includes a device controller being configured to generate an interrupt as an interrupt message packet for a coprocessor, which, in turn, carries out processing functions that otherwise are performed by the host processor. The device controller can reside either internal or external to the I/O communication subsystem. In a specific embodiment, the I/O communication subsystem includes a steering module configured to embed an identifier associated with the coprocessor into the interrupt message packet. The steering module also is configured to transmit the interrupt message packet via the general-purpose bus to the coprocessor. The interrupt message packet facilitates elimination of specialized circuitry dedicated to redirect the interrupt from being sent to the host processor to being sent to the coprocessor. In at least one embodiment, a computing device includes a system chipset that is configured to facilitate peer-to-peer communications between a device controller and a coprocessor. In various other embodiments, a method performed by a computing device implements the functionality of a steering module and/or a cloaking module. Also, a computer readable media includes executable instructions that establish a peer-to-peer data transfer between a specialized input/output ("I/O") controller and an I/O processor without a host process servicing an interrupt message to establish the peer-to-peer data transfer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 2:
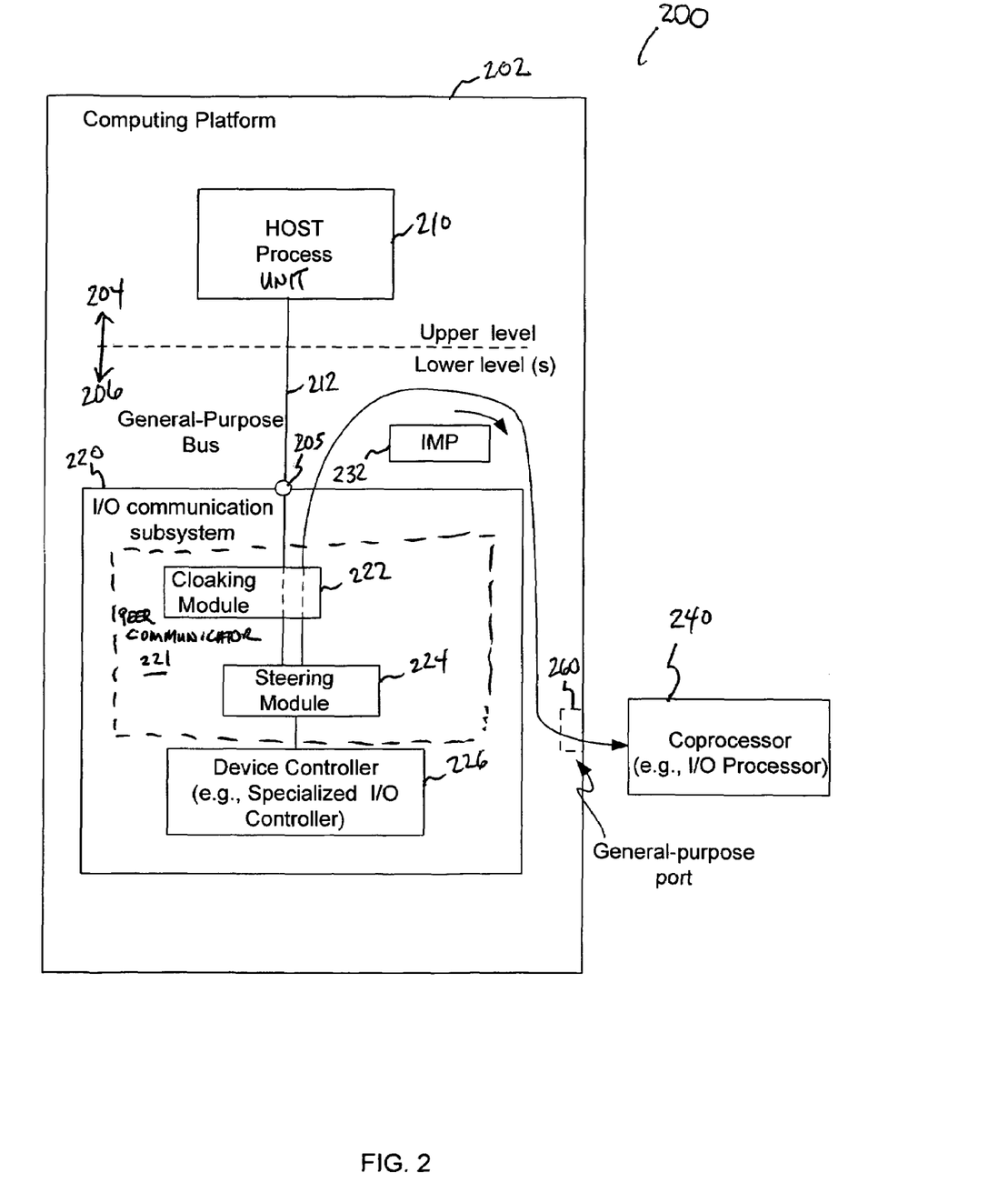
FIG. 2 is a block diagram of a computing device implementing an input/output ("I/O") communication subsystem that facilitates peer-to-peer communications between coprocessors and device controllers, according to at least one specific embodiment of the invention.

FIG. 2 is a block diagram of a computing device implementing an input/output ("I/O") communication subsystem that facilitates peer-to-peer communications between coprocessors and device controllers, according to at least one specific embodiment of the invention. Computing device 200 includes a computer platform 202 and a coprocessor 240. Further, computing platform 202 includes a host process unit 210 and an I/O communication subsystem 220, both of which communicate with each other over a general-purpose bus 212. General-purpose bus 212 includes a hierarchical bus topology that locates host process unit 210 at an upper level 204, and locates both I/O communication subsystem 220 and coprocessor 240 at one or more lower levels 206. Bus interface 205 couples I/O communication subsystem 220 to general-purpose bus 212. I/O communication subsystem 220 includes a peer communicator 221 for establishing peer-to-peer communications between I/O communication subsystem 220 and coprocessor 240 by generating interrupts as interrupt message packets ("IMP") 232. In the various embodiments of the invention, I/O communication subsystem 220 and its interrupt message packets advantageously eliminate the specialized circuitry and specialized sideband wires that are normally required to redirect interrupts and support data transfers. As such, I/O communication subsystem 220 does not impose non-standard requirements onto either computer platform 202 or a general-purpose port 260. Consequently, computer platform 202 can be a generic motherboard that requires no specialized circuitry to establish peer-to-peer communications for the various embodiments of the invention.

As shown, I/O communication subsystem 220 includes a device controller 226, and peer communicator 221, which is composed of a steering module 224 and a cloaking module 222. Device controller 226 is configured to control the functionality of one or more specific type devices. For example, device controller 226 can be designed to provide connectivity between coprocessor 240 and peripheral devices, such as disk drives, display screens, keyboards, printer devices, memory, graphics processing units, and the like. Device controller 226 can also be designed to provide an interface between coprocessor 240 and various bus architectures, such as a universal serial bus ("USB"), a small computer system interface ("SCSI"), and the like. In one embodiment, device controller 226 is configured as an I/O controller that can control devices implementing serial advanced technology attachment ("SATA"), serial attached SCSI, Ethernet, and the like. In operation, device controller 226 generates interrupts as interrupt message packets 232 to request that coprocessor 240 perform a specified action. Device controller 226 transmits interrupts in cooperation with steering module 224.

Steering module 224 operates to steer interrupts to coprocessor 240 rather than other destinations, such as host process unit 210. To steer interrupts, steering module 224 can embed an identifier associated with coprocessor 240 into an interrupt message packet 232. The identifier uniquely identifies coprocessor 240 and can be, for example, an address. Steering module 224 also can transmit interrupt message packet 232 via general-purpose bus 212 to coprocessor 240. Beneficially, steering module 224 and its interrupt message packets 232 facilitate elimination of specialized circuitry used to redirect an interrupt from being sent to host process unit 210 to being sent to coprocessor 240, as is normally the case. Further, steering module 224 obviates a requirement to convert at least one of a number of general-purpose ports, such as general-purpose port 260, into a specialized port. A specialize port can be a card slot, for example, that includes dedicated specialized circuitry that restricts use of a traditional coprocessor 240 to that specialized port.

In one embodiment, steering module 224 configures interrupt message packet 232 to prevent interrupt processing by host process unit 210, thereby facilitating peer-to-peer communications between device controller 226 and coprocessor 240, as well as any other component of computing device 200. As used herein, the term "peer-to-peer" in some embodiments can refer to data communications between a data source, such as device controller 226, and a data destination, such as coprocessor 240, where both the data source and destination are at lower levels 206. "Peer-to-peer" data communications include data transfers and interrupts and can be either unidirectional or bidirectional. Notably, peer-to-peer communications can pass through upper level 204 without host process unit 210 processing an interrupt. In some cases, the data transfers of peer-to-peer communications (i.e., peer-to-peer data transfers) can include either program instructions (e.g., op-codes) or program data (e.g., operands), or both.

Cloaking module 222 is configured to prevent host process unit 210 from detecting device controller 226. Generally, host process unit 210 includes a discovery process that identifies components in computing device 200 that are in lower levels 206. One example of the discovery process is device enumeration, which is a known process of searching for computational resources accessible by a host, such as host process unit 210. Once host process unit 210 discovers a low-level component, it typically takes control of that component. Cloaking module 222 operates to hide at least device controller 226 from the discovery process of host process unit 210 so as to avoid resource conflicts, for example, if both host process unit 210 and coprocessor 240 were allowed to configure device controller 226. In some embodiments, computer platform 202 is a motherboard and general-purpose port 260 is a slot on a motherboard. Such a slot can be compatible with the Peripheral Component Interconnect Express ("PCIe") bus protocol and architecture. The Peripheral Component Interconnect Special Interest Group ("PCI-SIG") maintains the PCIe bus protocol and has a principal office in Portland, Oreg. Steering module 224 and cloaking module 222 each can be composed of either software or hardware, or a combination of both, as can other elements described herein.

Figure 3:
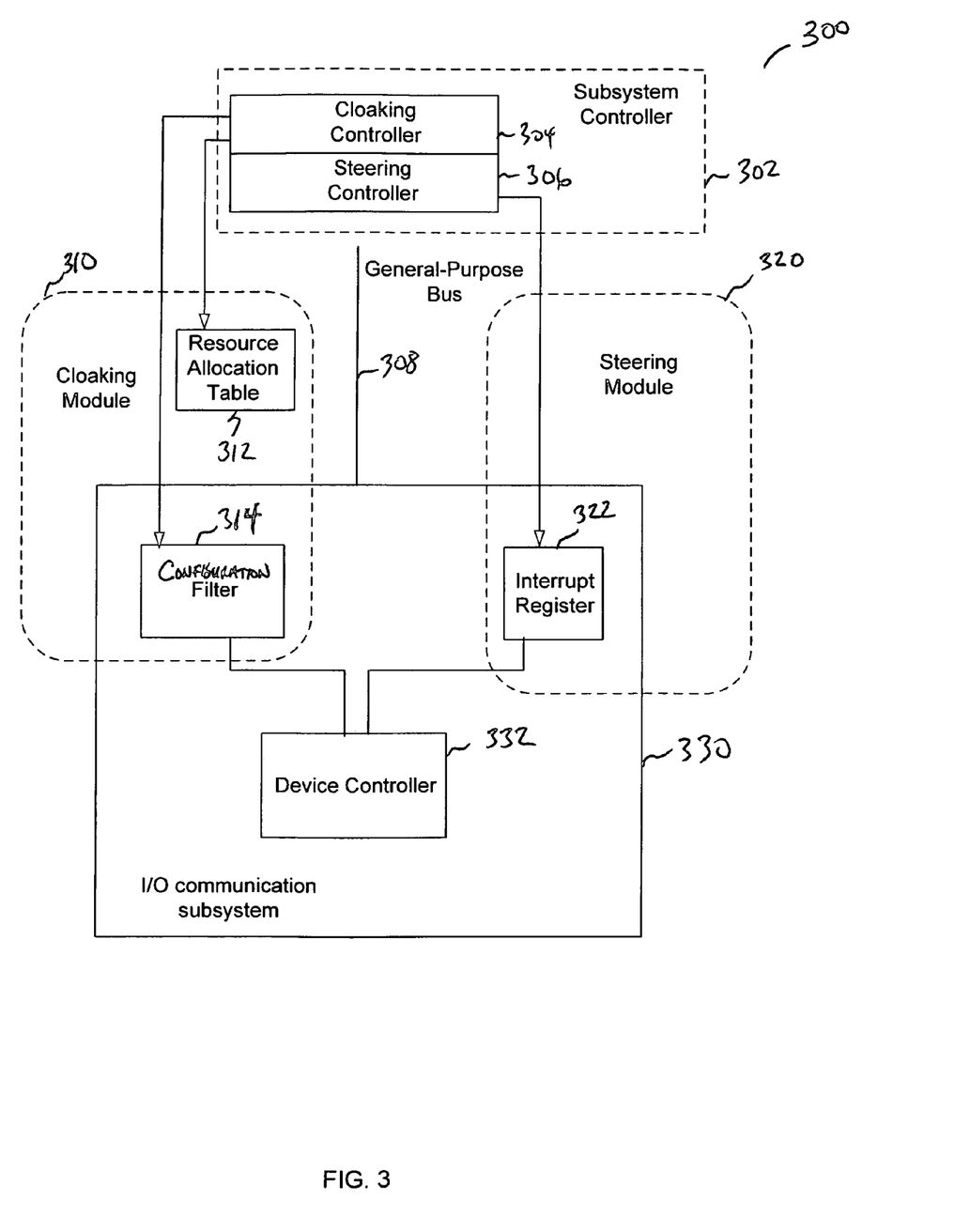
FIG. 3 is a block diagram of a computing device implementing examples of a steering module and a cloaking module, each of which facilitate peer-to-peer communications, according to a specific embodiment of the invention.

FIG. 3 is a block diagram of a computing device implementing examples of a steering module and a cloaking module, each of which facilitates peer-to-peer communications, according to a specific embodiment of the invention. As shown, computing device 300 includes a subsystem controller 302, a steering module 320 and a cloaking module 310. Subsystem controller 302 is coupled to steering module 320 and cloaking module 310 to control the operation of both. Specifically, subsystem controller 302 includes a cloaking controller 304 and a steering controller 306 for controlling cloaking module 310 and steering module 320, respectively. Cloaking controller 304 operates to hide device controller 332 from discovery. It also allocates resources for device controller 332. Since a host process (not shown) cannot discover device controller 332 within computing device 300, the host process cannot allocate resources for the device controller. Steering controller 306 functions to program steering module 320 with an identifier so that steering module 320 send an interrupt to the destination associated with the identifier. Steering controller 306 is one example of a means to load interrupt steering information into steering module 320.

According to one embodiment of the invention, steering module 320 is an interrupt register 322 from which steering module 320 retrieves the information for steering an interrupt to its destination. Once steering controller 306 programs interrupt register 322 with an identifier for a coprocessor, steering module 320 can access that register for determining the destination. Then, steering module 320 can insert (or embed) the identifier into a message packet (e.g., an interrupt message packet). Upon entry onto general-purpose bus 308, the identifier causes the message packet to travel to a coprocessor for interrupt processing rather than, for example, the host process.

According to a specific embodiment of the invention, cloaking module 320 includes a configuration filter 314 and a resource allocation table 312. Configuration filter 314 is configured to detect when a discovery process is trying to elicit a response from device controller 332. Device controller 332 normally responds to the discovery process, thereby establishing its existence. But since computing device 300 implements configuration filter 314, the discovery process receives a message from configuration filter 314 that no such device exists (i.e., device controller 332 is not there). In one embodiment, cloaking controller 304 programs a device identifier associated with device controller 332 into configuration filter 314. An example of such a device identifier is a device number or a combination of a bus number, device number and function number. So when configuration filter 314 detects the device identifier during a discovery process, it can respond with a master-abort message or an equivalent to signify that the there is no device that can support the discovery request (i.e., the request is unsupported). In some cases, configuration filter 314 selectably hides device controller 332. For example, configuration filter 314 can hide device controller 332 during configuration transactions initiated by the host process, but configuration filter 314 makes it visible to the host processor during other transactions, such during as memory transactions, I/O transactions and message transactions.

Resource allocation table 312 is configured to reserve computational resources for device controller 332 that the host process might otherwise consume. For example, cloaking controller 304 can reserve one or more reserved memory ranges, such as memory-mapped I/O ranges, for use by device controller 332. Other resources include I/O ranges, interrupt assignments, and the like. In some embodiments, computing device 300 disposes device controller 332 external to I/O communication subsystem 330. In this case, cloaking controller 304 also stores a bus number, such as a PCI bus number, in resource allocation table 312 to indicate that a root complex is to be hidden as are the devices below it. Examples of root complexes are described in FIGS. 4-8. In one embodiment, resource allocation table 312 is a table compatible with the Advanced Configuration and Power Interface ("ACPI") specification, which is maintained by a consortium of at least the following companies: Hewlett-Packard, Inc., Intel, Inc., Microsoft Inc., Phoenix, Inc., and Toshiba, Ltd.

According to one embodiment of the invention, subsystem controller 302 is a control module that includes program instructions implementing a basic input/output system ("BIOS") and/or an option ROM as an extension to the BIOS. As such, subsystem controller 302 operates to load steering module 320, and to program a device identifier, for example, into configuration filter 314. Although FIG. 3 shows steering module 320 and configuration filter 314 being disposed in I/O communication subsystem 330, either or both can be disposed external to I/O communication subsystem 330. Further, cloaking module 310 and/or steering module 320 can be located entirely within I/O communication subsystem 330.

In a specific embodiment, subsystem controller 302, as an option ROM, queries at least the device identifiers at which hidden device controllers 332 are configured. Subsystem controller 302 then issues configuration cycles to program the interrupt generation functions of device controller 332. In at least one embodiment, the BIOS or option ROM programs interrupt register 322, which is located in configuration space, with values that reference the I/O coprocessor's memory space. After the option ROM returns control to the system BIOS (both of which constitute subsystem controller 302), the system BIOS activates configuration filters 314 so that hidden device controllers 332 no longer respond to configuration transactions. In operation, a coprocessor (not shown in FIG. 3) will take no external action until its subsystem controller 302 initiates communication with it. Subsystem controller 302 typically provides a list of one or more device controllers 332 that the coprocessor should control, together with the memory ranges assigned to the BARs of the hidden device controllers. The coprocessor generally initiates communication with device controllers 314 by issuing reads and/or write cycles to the memory-mapped registers of device controller 314 to validate whether the interrupt generation functions are operational.

Figure 4:
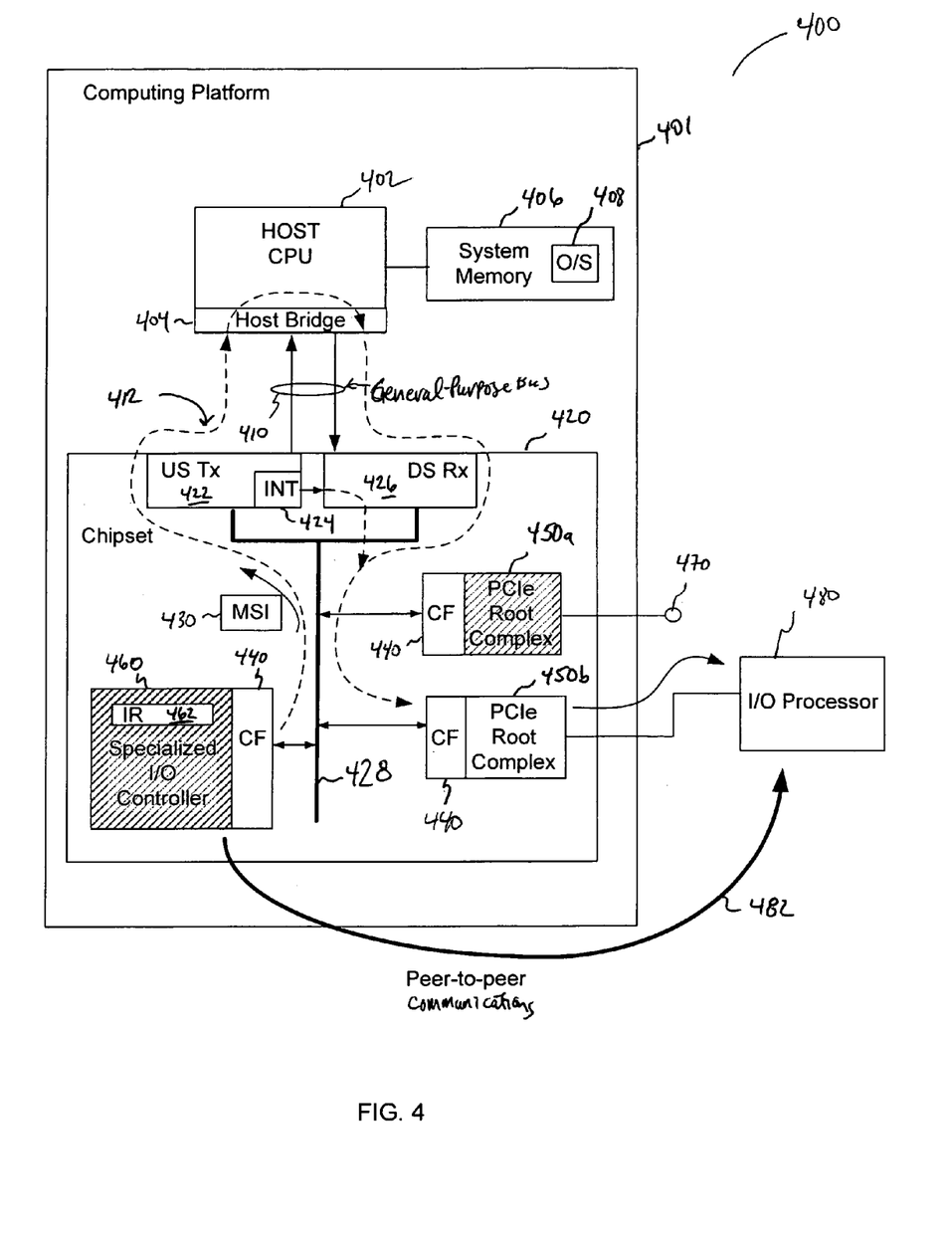
FIG. 4 is a block diagram of a computing device implementing a Message Signaled Interrupt ("MSI") transaction as an interrupt message packet, according to a specific embodiment of the invention.

FIG. 4 is a block diagram of a computing device implementing a Message Signaled Interrupt ("MSI") transaction as an interrupt message packet, according to a specific embodiment of the invention. In this example, computing device 400 includes a computing platform 401 and an I/O processor 480, which is a coprocessor configured to process I/O functions that otherwise would be performed by a host process. Computing platform 401 includes a host CPU 402, a system memory 406 and a system chipset ("chipset") 420. System memory includes an operating system ("O/S") 408, which, among other things, includes program instructions for performing device discovery processes. In particular, the discovery process performs configuration cycles to enumerate devices configurable by its host process. In this case, host CPU 402 and a system memory 406 together establish a host process that interacts via a general-purpose bus 410 with chipset 420. As used herein, the term "host process" in some embodiments can refer to either a host processor, such as a CPU or general purpose graphics processing unit ("GPGPU"), or a host operating system ("O/S"), or both. Host CPU 402 optionally includes a host bridge 404 that provides an interface to general-purpose bus 410, which is a system bus that is capable of bridging to a Peripheral Component Interconnect Express ("PCIe") bus protocol. Hence, general-purpose bus 410 is a bus composed of a point-to-point mesh network containing nodes at the same hierarchical level. General-purpose bus 410, however, can be configured to convey transactions to and from hierarchical I/O expansion bus architectures, such as PCI, PCI-X and PCI Express. Host bridge 404 is either a process or a structure, or a combination of both, and generally resides at the upper level(s) of such a hierarchical bus topology. Since it resides at an upper level, host bridge 404 can operate to orchestrate interrupts and data transfers between peripheral devices (e.g., PCIe-compatible devices) and host CPU 402, whereby host bridge 404 can function as a bus master, a bus target, and/or a device configuration mechanism.

Chipset 420 includes an upstream transmitter ("US Tx") 422 and a downstream receiver ("DS Rx") 426, both of which are communicatively coupled to an internal system chipset bus 428. Upstream transmitter 422 and downstream receiver 426 facilitate upstream data transfers and downstream data transfers, respectively, between host CPU 402 and internal system chipset bus 428. Chipset 420 also includes a specialized I/O controller 460, one or more configuration filters 440, and any number of root complexes 450, two of which are shown as root complexes 450a and 450b. Further to this example, specialized I/O controller 460 is a device controller configured to perform a specialized control function; it controls input and output data flows corresponding to a specific type of device, such as a device implementing serial attached SCSI. Specialized I/O controller 460 can be configured to generate an interrupt as an I/O interrupt message packet for I/O processor 480. Specialized I/O controller 460 includes one or more interrupt registers ("IR") 462. In one embodiment, one or more interrupt registers 462 constitute a steering module, in whole or in part. In a specific embodiment, these one or more interrupt registers 462 are MSI registers that provide addresses specifying I/O processor 480 (as an interrupt destination) and a corresponding value, which can represent an interrupt that an MSI transaction writes into memory-mapped I/O ranges for the device controller. In one embodiment, a steering controller loads the address and value into one or more interrupt registers 462.

One or more configuration filters 440 are configured to hide specialized I/O controller 460 and any of root complexes 450a and 450b from a discovery process initiated by host CPU 402. As shown, each configuration filter 440 is configured to hide an associated component, such as specialized I/O controller 460 and root complexes 450a and 450b. Hidden components are represented in FIG. 4 with cross-hatching. Note that the functionality of the configuration filters 440 can be provided by a single configuration filter 440 disposed within chipset 420, according to some embodiments of the invention. Root complex ("PCIe root complex") 450a and root complex 450b are each configured to provide, for example, one or more PCIe links as communications paths between various components of computing device 400. These one or more PCIe links are downstream from either root complex 450a or 450b. To illustrate, root complex 450a provides a PCIe link to I/O processor 480, thereby establishing peer-to-peer communications 482 between specialized I/O controller 460 and I/O processor 480.

Figure 6:
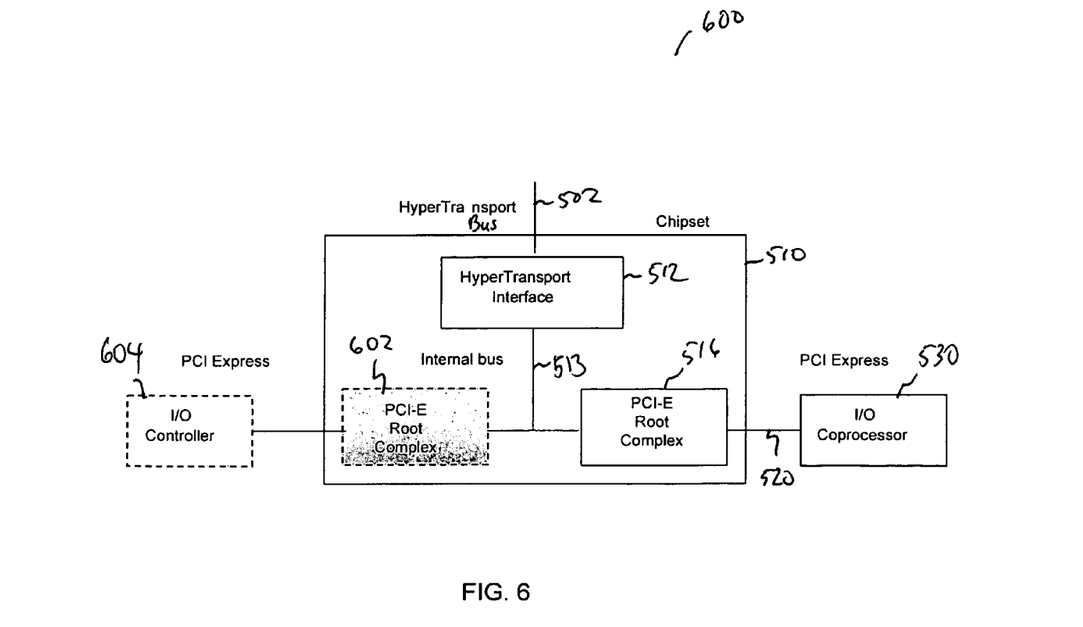

According to some embodiments of the invention, peer-to-peer communications 482 can be implemented in various ways. For example, peer-to-peer communications 482 can be established over a host-reflected path 412. In this instance, consider that upstream transmitter 422 and downstream receiver 426 both constitute an upstream/downstream transceiver module that operates in accordance with a HyperTransport bus protocol. As such, upstream transmitter 422 and downstream receiver 426 establish a HyperTransport link (e.g., a Lightning Data Transport, or LDT) link between host CPU 402 and internal system chipset bus 428. The HyperTransport Technology Consortium maintains the HyperTransport bus protocol and has a principal office located in Sunnyvale, Calif., USA. Host-reflected path 412 extends from specialized I/O controller 460 via host bridge 404 of host CPU 402 to I/O processor 480. Note that host bridge 404 redirects an MSI 430, as well as data transfers between specialized I/O controller 460 and I/O processor 480, without host CPU 402 either processing the interrupt associated with MSI 430 or the data within the data transfer. In one embodiment, upstream transmitter 422 includes an interceptor 424 to intercept MSI 430 on an upstream path (e.g., a portion of host-reflected path 412) prior to entering, for example, host bridge 404, thereby internally redirecting MSI 430 (i.e., internal to chipset 420) downstream to root complex 450b, which then sends MSI 430 out to I/O processor 480. Interceptor 424 can also intercept data transfers as well. In a specific embodiment, I/O processor 480 can control a specialized I/O controller located external to chipset 420 and connected to terminal 470. In this case, the external specialized I/O controller (not shown) is connected to root complex 450a, which is hidden from host CPU 402 by configuration filer 440. FIG. 6 depicts an example of an externally located I/O controller. MSI 430 can be implemented in accordance with a PCIe specification, a HyperTransport specification, or any equivalent specification implementing bus architectures and protocols similar to the aforementioned. MSI 430 can also be implemented in accordance with MSI-X, or any other equivalents thereof. MSI-X is an extension of MSI, one version of which is maintained by PCI-SIG.

In a specific embodiment, system memory 406 of FIG. 4 can include a computer readable media that includes executable instructions for establishing peer-to-peer communications 482 between a specialized I/O controller 460 and I/O processor 480 without a host process servicing an interrupt message to establish peer-to-peer communications 482. The executable instructions can include instructions to hide specialized I/O controller 460 from a device discovery process. The instructions to hide specialized I/O controller 460 can include instructions to allocate resources for specialized I/O controller 460 so that host CPU 402 does not use those resources. The instructions to hide specialized I/O controller 460 can also include instructions to load a device identifier specifying specialized I/O controller 460 into configuration filter 440. With this device identifier, the instructions to hide specialized I/O controller 460 generate a response to the device discovery process that indicates an unsupported request (e.g., a master-abort response would indicate no such device exists) for the device identifier. The executable instructions further include instructions to steer the interrupt message to a destination address specifying I/O processor 480. These instructions can also include instructions to load the destination address into a register, and intercept the interrupt message for redirection from an upstream path that includes host process 402 to I/O processor 480, if I/O processor 480 is associated with host CPU 402. That is, there is no other host CPU (not shown) between specialized I/O controller 460 and I/O processor 480. Further, there is no other intervening chipset (not shown). The instructions to steer the interrupt message also includes instructions to transmit the interrupt message to another I/O processor (not shown), if the other I/O processor is associated with another chipset, such as illustrated in FIGS. 7 and 8.

Figure 5:
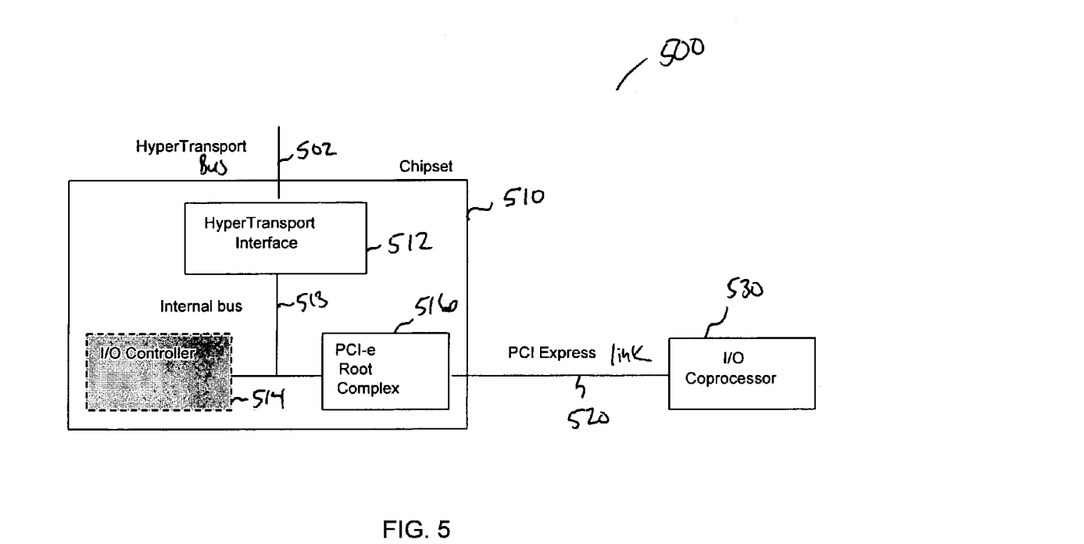
FIGS. 5 to 8 illustrate various computing device structures in which coprocessors and device controllers are disposed, according to various embodiments of the invention.

FIGS. 5 to 8 illustrate various computing device structures in which coprocessors and device controllers are disposed, according to various embodiments of the invention. FIG. 5 shows a computing device 500 having a chipset 510 coupled via a PCIe link 520 to an I/O coprocessor 520. PCIe link 520 forms a portion of a PCIe bus. Note that in some embodiments, the term "link" can be synonymous with the term "bus." Chipset 510 includes a HyperTransport interface 512 as an upstream/downstream module for communicating data with HyperTransport bus 502. An internal bus 513 couples HyperTransport interface 512 to a hidden I/O controller 514 and a root complex ("PCIe root complex") 516. Peer-to-peer communications between I/O controller 514 and I/O processor 530 are supported by root complex 516. Similar to computing device 500 of FIG. 5, FIG. 6 depicts a computing device 600 having a chipset 510 coupled via a PCIe link 520 to I/O coprocessor 520. But computing device 600 includes an external I/O controller 604 located external to chipset 510. In this case, root complex 602 facilitates peer-to-peer communications between external I/O controller 604 and I/O processor 530. Both root complex 602 and external I/O controller 604 are hidden from a host process (not shown).

Figure 7:
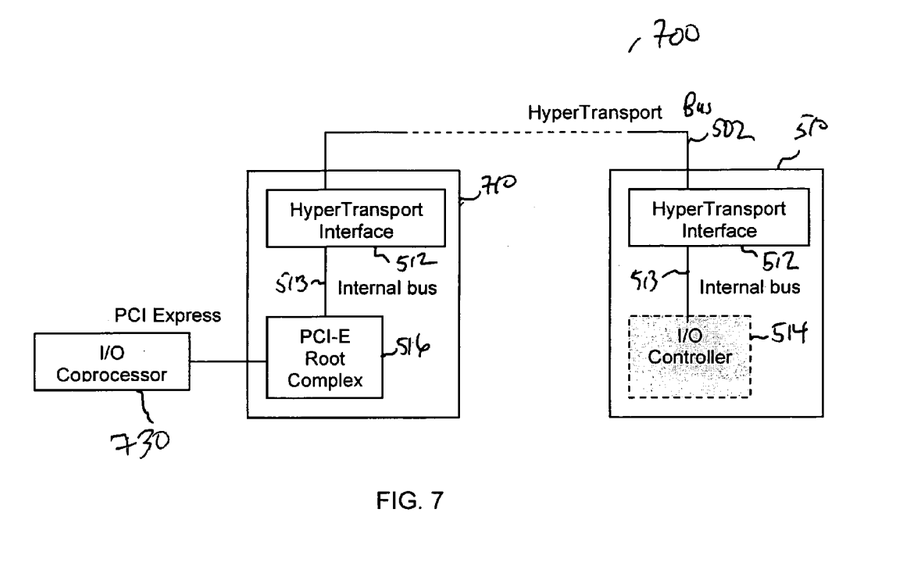
Figure 8:
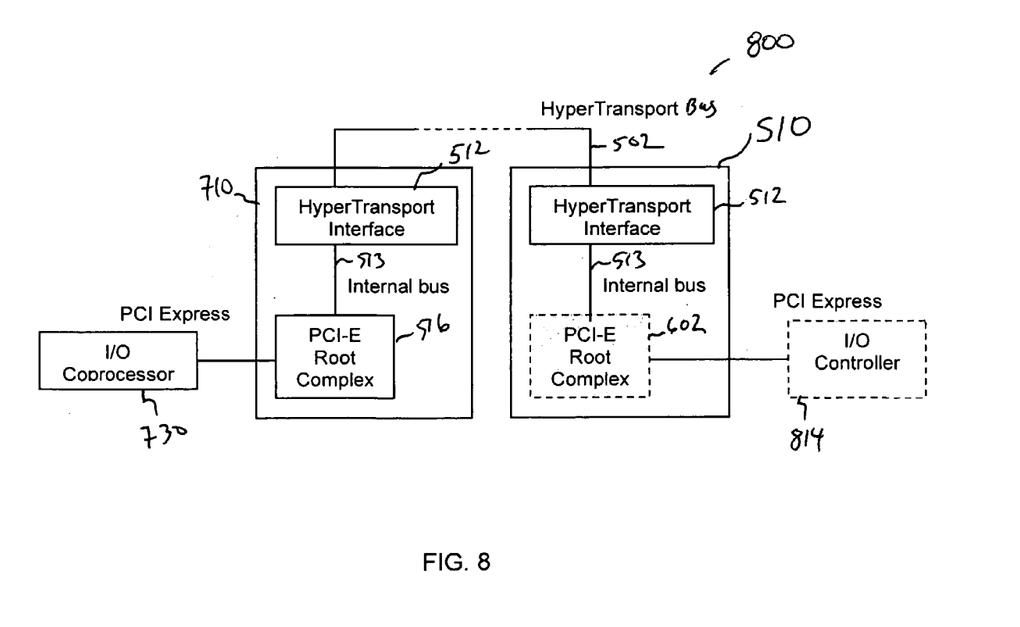

FIGS. 7 and 8 illustrate computing device structures in which coprocessors and device controllers are disposed at either different chipsets or different host processes, or both, according to some embodiments of the invention. FIG. 7 shows a computing device 700 having a chipset 510 coupled via a HyperTransport bus 502 to another chipset 710. HyperTransport bus 502 facilitates peer-to-peer communications between I/O coprocessor 730 and I/O controller 514. Both chipsets 510 and 710 include HyperTransport interfaces 512 and internal buses 513. Chipset 510 includes hidden I/O controller 514. Chipset 710 includes a root complex ("PCIe root complex") 516 to exchange data with I/O coprocessor 730. Similar to computing device 700 of FIG. 7, FIG. 8 depicts a computing device 800 having a chipset 510 coupled via a HyperTransport bus 502 to another chipset 710. But computing device 800 includes an external I/O controller 814 located external to chipset 510. In this case, root complex 602 facilitates—at least in part—peer-to-peer data transfers between external I/O controller 814 and I/O processor 730. Both root complex 602 and external I/O controller 814 are hidden from any number of host processes (none shown).

Figure 9:
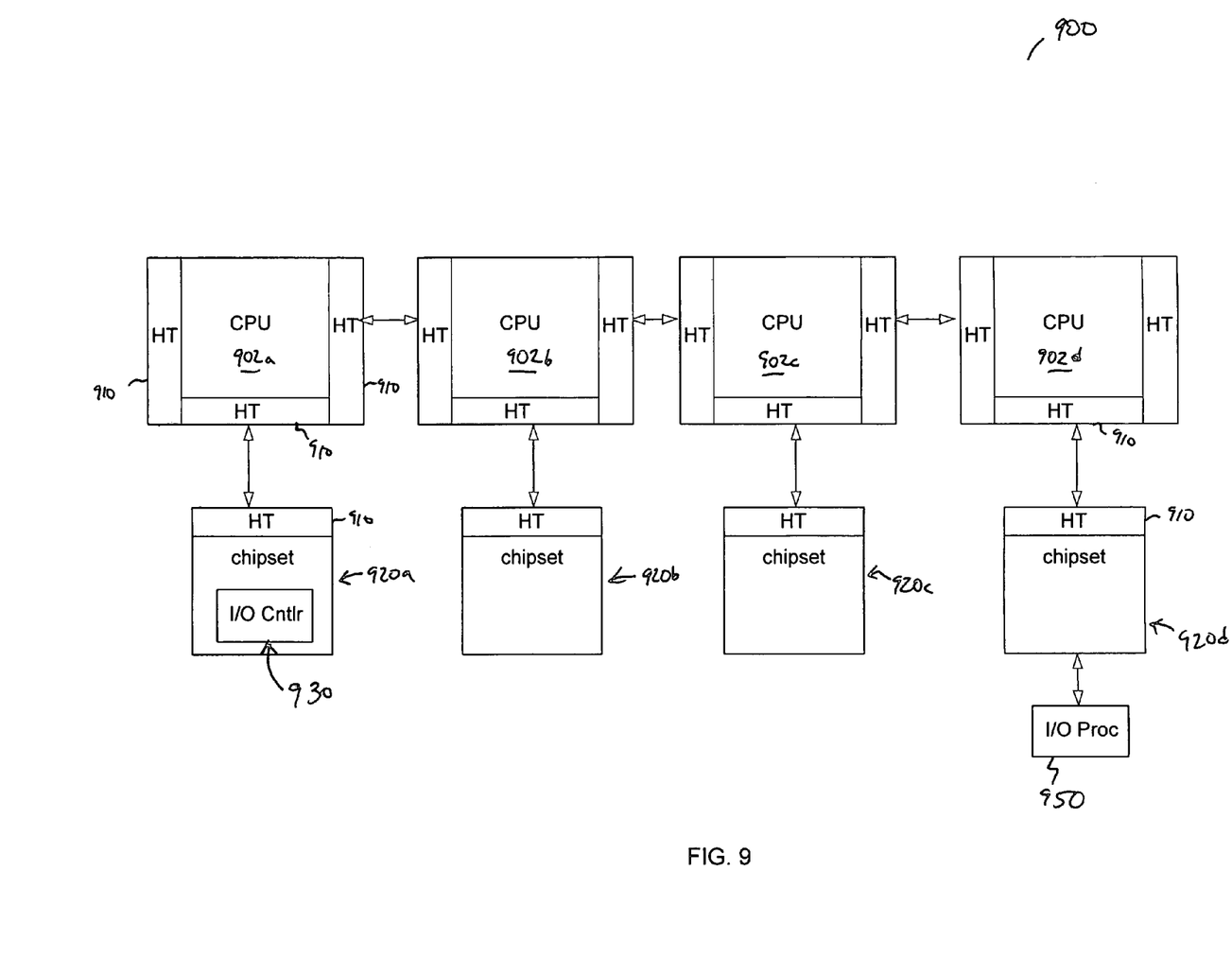
FIG. 9 illustrates a specific implementation for a computing device structure in which a coprocessor and a device controller are disposed at different chipsets and/or different host processes, according to at least one embodiment of the invention.

FIG. 9 illustrates a specific implementation for a computing device structure in which a coprocessor and a device controller are disposed at different chipsets and/or different host processes, according to at least one embodiment of the invention. FIG. 9 shows a computing device 900 having chipsets 920a to 920d, each being associated with a host processor in a group of CPUs including CPU 902a to CPU 902d. Notably, chipset 920a includes an I/O controller ("I/O Cntlr") 930, and chipset 920d is coupled to an I/O processor ("I/O proc") 950, as described in FIG. 7. Each chipset 920 and CPU 902 includes one or more HyperTransport interfaces ("HT") 910 as point-to-point transceiver modules that establish point-to-point HyperTransport links for sending interrupts and providing for data transfers between I/O controller 930 and I/O processor 950. In this structure, I/O controller 930 can send an interrupt as an MSI packet from chipset 920 via HyperTransport interfaces 910 of CPUs 902a to 902d and chipset 920d to I/O processor 950. Data transfers can follow the same path.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments. For example, although the above descriptions of the various embodiments relate to coprocessor and device controller communications, alternative embodiments can apply to communications amount other components of one or more computing devices.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A computer device including an input/output ("I/O") communication subsystem for forming data paths to exchange data via a general-purpose bus between a plurality of peripheral devices and a host processor, said I/O communication subsystem comprising:
   a bus interface for coupling said I/O communication subsystem to said general-purpose bus;
   a device controller being configured to generate an interrupt as an interrupt message packet for a coprocessor to carry out processing functions that otherwise are performed by said host processor; and
   a steering module configured to
      embed an identifier associated with said coprocessor into said interrupt message packet, and
      transmit said interrupt message packet via said general-purpose bus to said coprocessor.

2. The I/O communication subsystem of claim 1 wherein said steering module further comprises an interrupt register configured to specify the destination of said interrupt.

3. A computer device including an input/output ("I/O") communication subsystem for forming data paths to exchange data via a general-purpose bus between a plurality of peripheral devices and a host processor, said I/O communication subsystem comprising:
   a bus interface for coupling said I/O communication subsystem to said general-purpose bus;
   a device controller being configured to generate an interrupt as an interrupt message packet for a coprocessor to carry out processing functions that otherwise are performed by said host processor; and
   a cloaking module configured to prevent said host processor from detecting said device controller,
   wherein said cloaking module comprises a filter configured to hide said device controller from a discovery process performed by an operating system to enable said coprocessor to configure said device controller.

4. A computer device including an input/output ("I/O") communication subsystem for forming data paths to exchange data via a general-purpose bus between a plurality of peripheral devices and a host processor, said I/O communication subsystem comprising:

a bus interface for coupling said I/O communication subsystem to said general-purpose bus;

a device controller being configured to generate an interrupt as an interrupt message packet for a coprocessor to carry out processing functions that otherwise are performed by said host processor; and additional host processors, said host processor and said additional host processors each including a point-to-point transceiver module to facilitate communicating data, wherein said device controller is configured to transmit said interrupt message packet to another coprocessor associated with any of said additional host processors.

5. A computer device including a system chipset for coordinating data transfers among a plurality of peripheral devices and a host processor via a system bus, one of said plurality of peripheral devices including an input/output ("I/O") processor, said system chipset comprising:

an internal system chipset bus;

an upstream/downstream transceiver module for facilitating upstream data transfers and downstream data transfers between said host processor and said internal system chipset bus;

a specialized I/O controller being configured to generate an interrupt as an I/O interrupt message packet for said I/O processor, said specialized I/O controller including:
an interrupt register for specifying an interrupt destination specifying said I/O processor;

a root complex for establishing peer-to-peer communications with said I/O processor; and one or more configuration filters to hide said specialized I/O controller and said root complex from a discovery process initiated by said host processor.

6. The system chipset of claim 5 wherein said upstream/downstream transceiver module operates in accordance with a HyperTransport bus protocol and is configured to form a host-reflected path that extends from said specialized I/O controller via a host bridge of said host processor to said I/O processor, whereby said host bridge redirects said I/O interrupt message packet without servicing said interrupt, said I/O interrupt message packet being formed as a message signal interrupt ("MSI").

7. The system chipset of claim 6 further comprising an interceptor to intercept said I/O interrupt message packet on an upstream path prior to entering said host bridge to redirect said I/O interrupt message packet downstream to said I/O processor.

8. The system chipset of claim 5 wherein said system bus is configured to couple said system chipset to said I/O processor, said system bus being compatible with a Peripheral Component Interconnect Express ("PCIe") bus protocol.

9. The system chipset of claim 5 wherein said host processor further comprises:

an operating system configured to perform configurations cycles for said discovery process to enumerate devices configurable by said operating system; and a loading means for programming an interrupt destination address into said interrupt register.

10. The system chipset of claim 5 wherein said specialized I/O controller is integrated within said system chipset and is configured to control I/O data transfers for a specific peripheral device.

11. A computer readable media including executable instructions for establishing a peer-to-peer communications between a specialized input/output ("I/O") controller and an I/O processor without a host process servicing an interrupt message to establish said peer-to-peer communication, said executable instructions comprising instructions to:

hide said I/O controller from a device discovery process, said instructions to hide said I/O controller including instructions to:
allocate resources for said I/O controller so that said host process does not implement said resources; and
load a device identifier specifying said I/O controller into a configuration filter to generate a response to said device discovery process, said response being indicative of an unsupported request for said device identifier.

12. The computer readable media of claim 11 wherein said executable instructions further comprise instructions to:

steer said interrupt message to a destination address specifying said I/O processor.

13. The computer readable media of claim 12 wherein said instructions to steer said interrupt message further comprise instructions to:

load said destination address into a register;

intercept said interrupt message for redirection from an upstream path that includes said host process to said I/O processor, if said I/O processor is associated with said host process; and transmit said interrupt message to another I/O processor, if said another I/O processor is associated with another host process.

* * * * *